N° 109,226

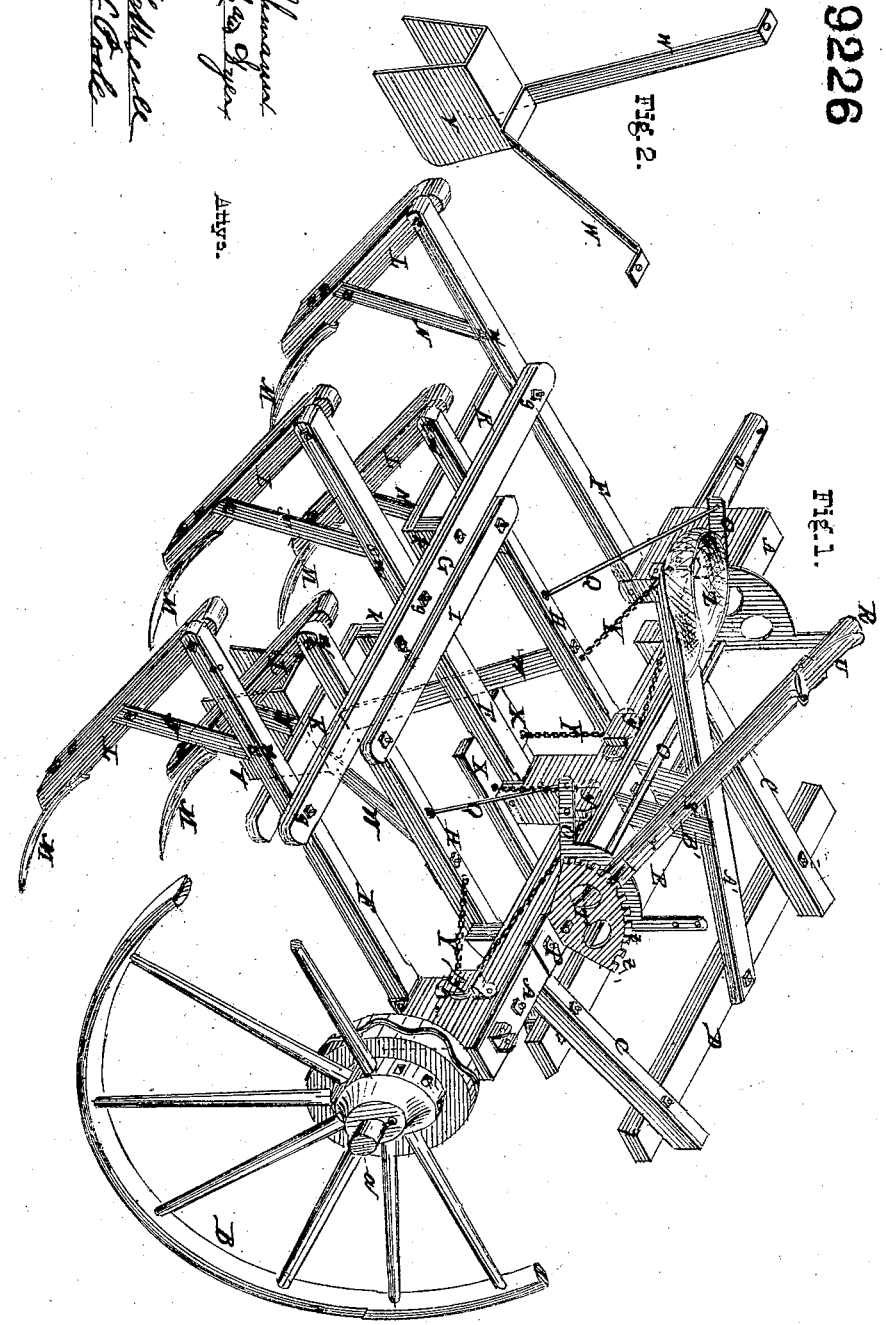

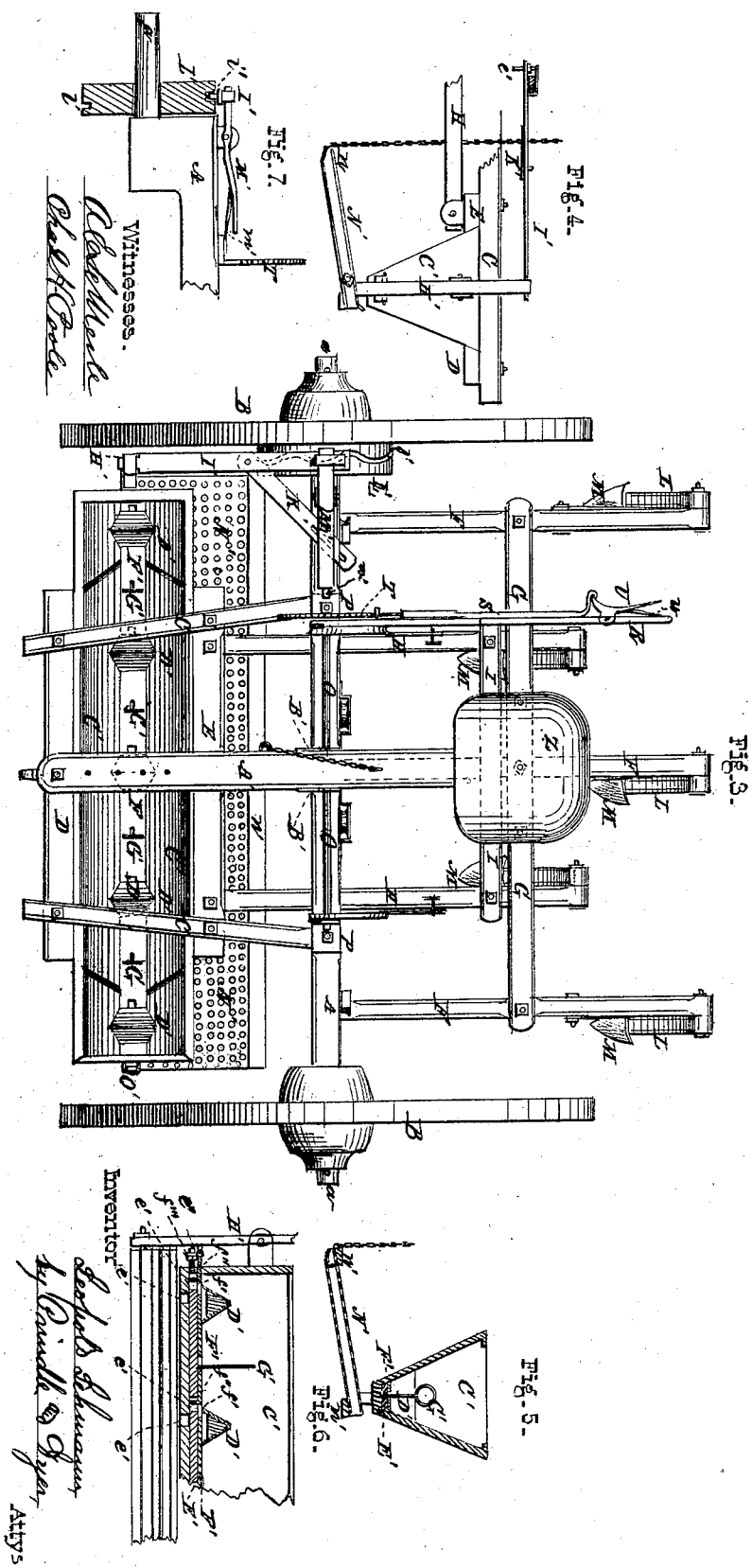

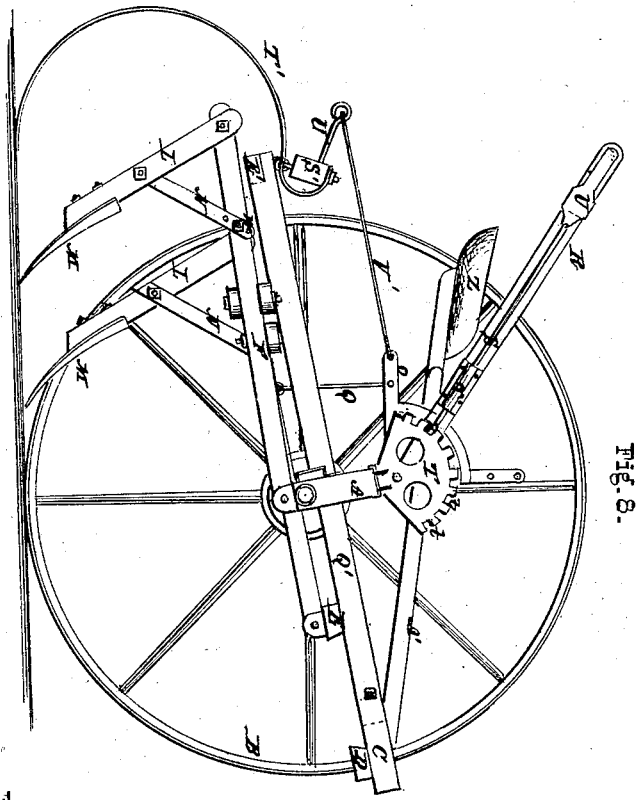
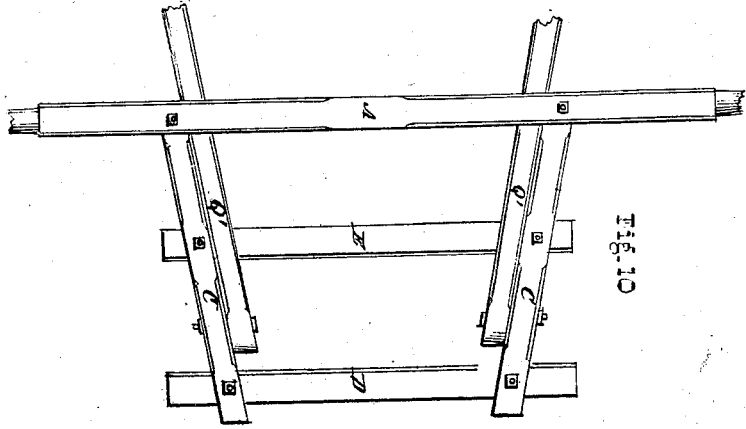

Leopold Lehmann — Comb'd Agricultural Implement.
[Corn Planter]

Witnesses.

Inventor.
Leopold Lehmann
by Cavell & Jager
Attys.

United States Patent Office.

LEOPOLD LEHMANN, OF MONEE, ILLINOIS.

Letters Patent No. 109,226, dated November 15, 1870.

IMPROVEMENT IN COMBINED AGRICULTURAL IMPLEMENTS.

The Schedule referred to in these Letters Patent and making part of the same.

*To all whom it may concern:*

Be it known that I, LEOPOLD LEHMANN, of Monee, in the county of Will and in the State of Illinois, have invented certain new and useful Improvements in Combined Agricultural Implements; and do hereby declare that the following is a full, clear, and exact description thereof, reference being had to the accompanying drawing making a part of this specification, in which—

Figure 1 is a perspective view of my device as used for a cultivator;

Figure 2 is a like view of a shield or protector, used when cultivating corn;

Figure 3 is a plan view of the device as arranged for a sower;

Figure 4 is an end elevation of the seed-box, showing the means employed for operating the dropping devices;

Figure 5 is a vertical cross-section of said seed-box and of the separator;

Figure 6 is a vertical longitudinal section of the same;

Figure 7 is a rear elevation of the devices for operating the seed-dropper;

Figure 8 is a side elevation of the device, as arranged for a hay-rake;

Figure 9 is a perspective view of one of the rake-teeth;

Figure 10 is a plan view of the upper side of the frame;

Letters of like name and kind refer to like parts in each of the figures.

Figure 12:
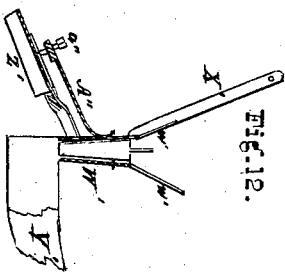
Figure 12 is a vertical section of the planting and covering devices in a line with the draft.

My invention has for its object the production of a combined agricultural implement containing a cultivator, seeder, corn-planter, and hay-rake, each of which shall be simple in construction, easy and efficient in operation, and by having in common the frame, seed-box, operating devices, &c., can be furnished at a much lower cost than if separate; to which end, It consists, first, in the construction and arrangement of the permanent frame, as is hereinafter set forth.

It further consists in the means employed for imparting a lateral motion to cultivator-bars, and for actuating the dropping devices of the corn-planter, as is hereinafter specified.

It further consists in the means employed for adjusting vertically the cultivator-bars and corn-planting devices, and for tripping the rake-head, as is hereinafter described.

In order to better illustrate the construction and operation of my machine I will describe separately each arrangement of the same.

In fig. 1 of the annexed drawing—

A represents the axle-tree, having pivoted upon its ends two ground-wheels, B and B', the journals $a$ for which are dropped below said axle, as shown in fig. 1.

Secured at their rear ends upon the lower side of the axle A are two bars, C, which from thence project forward and slightly inward, and are connected together by means of two cross-bars, D and E, the first of which is secured upon the lower side of said bars C, at or near their front ends, while the latter is secured in a like manner near their center, longitudinally, the whole forming the permanent frame of the machine.

F, F, and F, represent three bars, pivoted at their front ends to the lower side of the axle A, near its ends and at its center, from whence they extend rearward in parallel lines and are connected together by means of a cross-bar, G, resting upon their upper sides, and secured loosely to each by means of a bolt, $g$.

Two other bars, H, corresponding in dimensions with the bars F, are pivoted loosely to the cross-bar E, and from thence extending rearward parallel with and equidistant from said bars, are connected together by means of a cross-bar, I.

Two short cross-bars, K, secured at their outer ends beneath the bars F, and at their inner ends upon two blocks, $k$, form a guide through which the rear ends of the bars H extend, and by means of which the latter, while allowed free lateral motion, are retained in the same vertical plane as are the bars F.

Each of the bars F and H has pivoted to its rear end the upper end of a short bar, L, to the lower end of which is attached a shovel, M, of usual form.

A metal brace, N, connected to each of the bars L at a point midway between its ends, and to the bars F or H at an equal distance from their point of intersection with said bar L, furnishes a means whereby the desired forward inclination of the latter may be secured and maintained, to accomplish which result the upper end of each brace is provided with a series of holes for the reception of the connecting-bolt $n$, so as to allow said brace to be shortened or lengthened.

In order that the shovels may be raised or lowered when desired, a shaft, O, suitably journaled within metal bearings P, attached to the upper side of the axle A, is provided with two arms, $o$, which extend radially outward and to the rear in the same plane, and are connected to the bars H by means of two metal rods, Q, so that when said shaft is partially rotated, the radial motion of said arms communicates a corresponding vertical motion to said bars and the shovels.

A lever, R, secured to and projecting upward from the shaft O, has upon one side a detent, S, so arranged as to slide longitudinally within a bearing, r, and engage at its lower end with one of a series of notches, t, provided within the edge of a segment, T, and thereby lock said lever in position.

A short semicircular lever, U, pivoted to the lever R, near its upper end, and loosely connected at one end to the upper end of the detent-rod S, furnishes a means whereby said detent may be released from engagement with the segment, when desired, while a spring, u, secured to said lever R and pressing against the upper end of said lever U, secures the engagement of said detent when not purposely released.

When used for cultivating corn, the rear center shovel is removed and a metal shield, V, having the form shown in fig. 2, is secured to the machine by means of a V-shaped brace, W, attached at its center to said shield and at its ends to the bar H, immediately in rear of the axle.

Two foot-levers, X, pivoted at their front ends to the cross-bar E, and projecting beneath and to the rear of the axle A, are each connected to the bars H by means of a chain, Y, which passes upward around a pulley, y, secured upon the rear side of said axle, outward around a second pulley, y, placed near the end of said axle and from thence extending inward has its end fastened to or upon said bar H.

A seat, Z, secured upon the rear end of a bar, A', that is attached at its front end to a cross-bar, D, and rests within a metal crotch, B', extending upward from the axle, completes the device, the operation of which is as follows:

The operator being in position upon the seat Z, astride of the bar A', with his feet upon the foot-levers X, and the machine driven forward, the vertical adjustment of the shovels is secured by means of the lever R, while, by means of said foot-levers operating through the chains Y and bars H, the shield V is so guided as to cause it to pass directly over a row of corn and protect it from the soil turned up by the front shovels, which soil would otherwise cover and injure the young corn.

The especial advantages possessed by this device are that by it the operator is enabled to readily adjust and maintain the vertical position of the shovels, regardless of the inequalities of the ground, and in cultivating corn he can so guide the shield and contiguous shovels as to cause them to protect and operate upon a row in the most perfect manner.

For use as a feeder, the shield V, foot-levers X, and chains Y are removed, and a seed-box or hopper, C', with its operating devices, added.

As seen in fig. 4, the seed-box C', having the usual V-shape, transversely, is placed between the cross-bars D and E, the inner edges of which conform to and fit against the sides of said box, so as to hold it firmly in position immediately beneath the bars C.

A series of openings, c', corresponding in number and in position, transversely, with the shovels M, are provided in and through the bottom of the seed-box, and have placed over each a wedge-shaped cover, D', which prevents seed from passing directly from the box.

Resting upon the real bottom of the seed-box, beneath the cover D', is a false or movable bottom, E', in and through which are a number of openings, e', corresponding in size and relative position with those within said real bottom, by which means said movable bottom or slide may be adjusted lengthwise, so as to cause said openings to coincide and permit the contents of those within the slide E' to be discharged through those within the bottom, or, by changing the position of the slide, all passage of seed may be prevented.

In order that the size of the openings e' may be changed, so as to correspondingly vary the quantity of grain sown, the upper face of the slide is covered by a plate of sheet-metal, F', in and through which is cut a number of openings, f', corresponding in size and position to those within said slide.

A flange, f'', corresponding in width to the width of the opening e', and in length to the thickness of the slide E', is turned downward from the metal plate F' into the opening e', so that, if said plate F' be moved lengthwise of said slide, said opening e' will not only be shortened or lengthened, but their sides will be at all times vertical.

The longitudinal adjustment of the slide E' and plate F' is secured by means of a set-screw, e'', which is journaled within a flange, f''', projecting downward from the end of said plate, and extends into a suitable nut within the end of said slide, so that by turning said screw said slide is moved to and from said flange.

For use while sowing oats a rod, G', is secured within the upper face of the slide E', midway between the openings e', and, passing vertically upward through suitable slots within the plate F', serves to agitate said oats, so as to prevent them from clogging within the hopper.

The slide E' is operated by means of the following-described devices:

A lever, H', is pivoted upon the end of the seed-box, and loosely attached at its lower end to the outer end of said slide.

A second lever, I', pivoted at its center to a brace, K', attached to the upper side of the axle, and loosely connected at its forward end to the upper end of the lever H', is provided at its rear end with a stud, i', which passes downward into a serpentine groove, l', formed upon or within the periphery of the disk L, attached to and revolving within the inner end of the hub of one of the traction-wheels, so that a rotary motion of said wheel will produce a uniform reciprocating movement of the slide and cause the openings contained therein to be regularly filled with seed and discharged through the openings within the bottom of the seed-box.

In order that the motion of the sowing devices may be arrested when desired, a short lever, M', is pivoted upon the upper side of the axle, and has its outer end loosely attached to the rear end of the lever I', so that by pressing downward with his foot upon the inner end of said lever M', the operator can raise said lever I' sufficiently to release the stud i' from engagement with the groove l'.

Upon releasing the lever M' it is drawn upward by means of a spring, m', placed beneath its inner end, and the stud i' caused to engage again with the slot l'.

In most of the wheat sown a certain proportion of oats is found that has escaped the devices used for their removal.

To prevent said oats from passing into the ground with the wheat, I employ a screen formed of two sheets of reticulated metal, N', secured at their rear side and at their ends to suitable bars of wood, n', so as to leave between a space open to the front.

The bar n', secured to the rear of the screen, extends somewhat above the upper plate, so as to form a ledge which prevents the grain from passing from the rear side of said plate.

As thus constructed, the front edge of the separator is loosely attached to the lower end of the lever H' and to a strap, O', pivoted upon the opposite end of the seed-box, while its rear edge is upheld and adjusted vertically by means of a chain, P', passing upward from said separator through a staple, p', projecting from the side of the bar A', and having its end passed over a stud, a', projecting upward from the upper side of the bar.

The separator N' is only employed when sowing wheat containing oats, at which time its operation is as follows:

The grain discharged from the seed-box is caught by the separator, which, having a reciprocating movement, longitudinally, shakes said grain quickly in opposite directions, by which means the wheat is caused to pass through the openings, while the oats, being larger and more rough, are retained upon the top of said separator and pass to the rear against the bar n'.

The inclination of the separator should be such as to cause the grain to pass across the same but not over the bar n', and if it should be found to pass over said bar, the rear side of the separator should be slightly raised.

The oats collecting upon the separator and such as may reach the second plate may be removed, when desired, by raising the rear edge thereof, so as to cause them to slide upon the ground.

The advantages secured by this construction and arrangement of the parts are ease and thoroughness of operation combined with durability.

For use as a hay-rake, the wheels, axle, main frame, composed of the bars C and cross-bars D and E, and the shaft O, with its attachment, are employed, to which is attached the supporting-frame for the rake-head, consisting of two bars, Q', pivoted at their front ends to the bars C, and connected together at their rear ends by means of a cross-bar, R'.

The rake-head S', having a length somewhat greater than the breadth of the machine over the wheels, is loosely attached to the upper side of the cross-bar R' at the point of intersection with the bars Q', and has attached, at equidistant points upon its upper side, a number of teeth, T', formed of flat thin bars of metal bent in the shape shown in figs. 8 and 9, so as to pass downward in front of and beneath said rake-head.

The point of each tooth, as seen in fig. 9, is shaped like a cultivator-tooth.

Secured to and projecting rearward from the rake-head S' are two metal rods, U', having at their outer ends suitable eyes, to each of which is loosely attached the rear ends of other rods, V', having their front ends pivoted to or upon the arms o of the shaft O.

As thus constructed and arranged a partial rotation of the shaft O will cause the rake-head to rock upon the cross-bar R', so as to elevate the teeth and release their contents.

It will be noticed that the transverse shape of the teeth is different from any heretofore used, the object of which is to permit them to be employed to assist the cultivator in removing weeds from the surface of the ground, in accomplishing which result both rake and cultivator are connected with the main frame, as shown in fig. 8.

Figure 11:
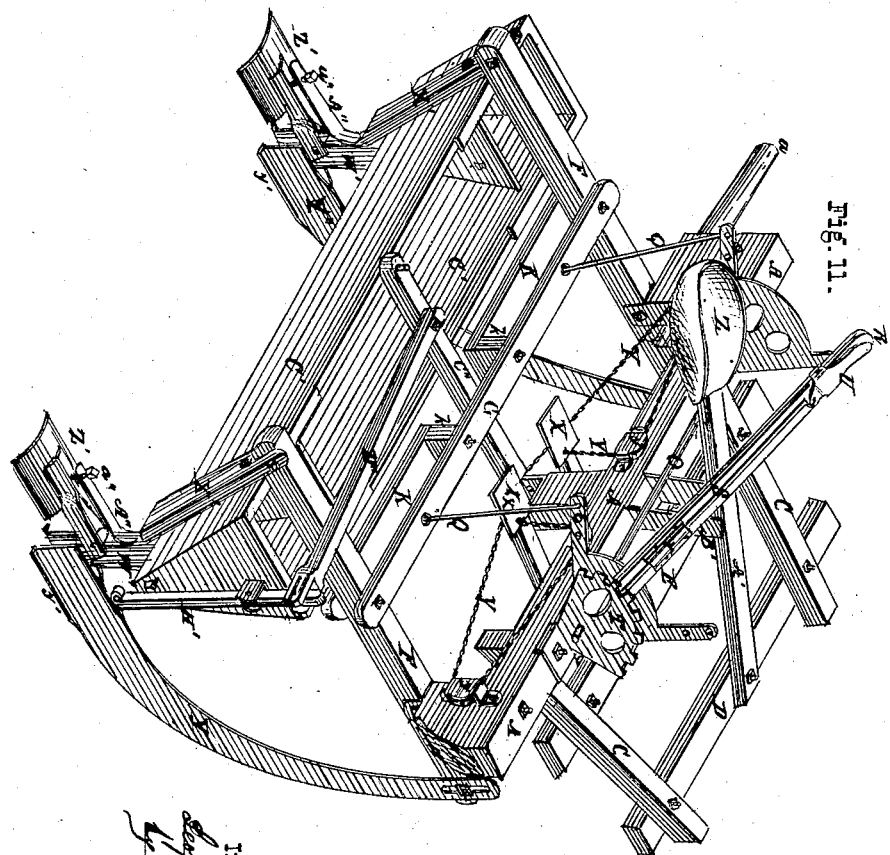
Figure 11 is a perspective view of the machine, arranged as a corn-planter.
Figure 13:
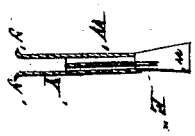
Figure 13 is a vertical transverse section of the same.

In fig. 11 is shown the machine as arranged for planting corn, in which the front ends of the outer bars F are extended somewhat forward of the axle, so as to bring the cross-bar G directly beneath the outer ends of the arms o, and permit the rods Q to be connected therewith.

Each end of the hopper C' is mounted upon a conductor, W', within a crotch formed by extending the front and rear sides w' of said conductor upward and outward at a corresponding angle with the sides of said hopper; and the whole is attached to the frame by means of a short bar, X', secured to the rear fork of each crotch, to the rear side of said hopper, and to the bar F.

A runner, Y', is pivoted at its front end to the corresponding end of each bar F, and from thence curving downward and to the rear, terminates in a vertically-divided or forked end, which incloses and is secured to the lower end of the spout or conductor W'.

A narrow flange, y', extending outward in a curve from each side of the bottom of the forked end of the runner Y', undercuts the soil in such a manner as to cause it to more readily fall inward and cover the corn.

Pivoted to the rear side of each spout W' in a semi-cylindrical plate, Z', placed with its concave side downward, as shown in figs. 11 and 12, the object of which is to cover the soil over the corn as it is deposited in the furrow formed by the runner.

A spring, A'', is secured, at its upper end, to the spout W', and from thence extends downward and rearward over the covering-plate, upon which said spring is caused to exert a downward adjustable pressure by means of a set-screw, a'', passing downward through the rear end of the latter and bearing upon the upper side of the former.

As but the end-openings in the bottom of the side-box are used for the passage of corn, a sufficient space for containing a supply of the latter is set apart at each end of the box by means of a partition, B'', having its edges fitted into corresponding grooves within the sides of said box.

The dropping-devices are operated so as to deposit the corn, when desired, by means of a lever, C'', pivoted, at its rear end, to the rear side of the seed-box, connected with the upper end of the lever H' by means of a bar, D'', and having attached to its front end the chains Y, so that motion imparted to the foot-levers X will be communicated through said chains, the lever C'', the connecting-bar D'', and the lever H', to the false bottom or slide.

A vibrating partition, E'', pivoted longitudinally within the spout or conductor W', and operated so as to retain within said spout each charge of corn until the succeeding charge passes through the slide, completes the device, the operation and advantages of which are as follows:

The operator takes position upon the seat Z, with his feet upon the foot-levers X, adjusts the depth of the runners, and, as the machine passes over the check-rows, by alternately depressing said foot-levers, drops the corn into the furrows, where it is covered by means of the coverer Z'.

As the varying condition of the soil may require, the pressure upon the coverer is changed so as to cause it to perform its office without dragging the corn from the position in which it is deposited by the dropping-devices.

Should a stone, hard mass of earth, or other obstruction, strike the coverer, the yielding of the spring A'' will be sufficient to permit said cover to raise and pass such obstruction, instead of dragging the latter along upon the ground and destroying the regularity of the rows of corn, as is the case where the coverer is rigidly attached.

As constructed and arranged one person can operate the corn-planter with ease, certainty, and dispatch; and from the simplicity of its parts and the readiness with which they can be adjusted, it is believed to be one of the most desirable devices ever constructed for this purpose.

Having thus fully set forth the nature and merits of my invention,

What I claim as new, and desire to secure by Letters Patent, is—

1. The permanent frame hereinbefore described, consisting of the axle A, the side-bars C, and the cross-bars D and E, supported by and upon the wheels B, substantially as and for the purpose specified.

2. In combination with the permanent frame, the bars F and H, provided with the bars L, shovels M, and braces N, substantially as shown and for the purpose set forth.

3. In combination with the bars F and H, the cross-bars G, I, and K, and the blocks k, substantially as shown, and for the purpose specified.

4. The means employed for raising or depressing the cultivator-bars or the corn-planting devices, and for tripping the rake, consisting of the shaft O journaled upon the axle, and provided with the arms o, the rods Q, the lever R, and the detent S, engaging with the notched segment T, and operated by means of the hand-lever U, substantially as and for the purpose shown.

5. The seed-box C', constructed as described, and combined with and supported by the cross-bars D and E, substantially as shown and set forth.

6. The means employed for operating the dropping-devices, consisting of the lever C" and connecting-bar D", in combination with the foot-levers X, the chains Y, and the pulleys y, substantially as and for the purpose specified.

In testimony that I claim the foregoing, I have hereunto set my hand this 7th day of May, 1870.

LEOPOLD LEHMANN.

Witnesses:
GEO. S. PRINDLE,
EDM. F. BROWN.